(12) United States Patent
Maggiore et al.

(10) Patent No.: US 8,824,731 B2
(45) Date of Patent: Sep. 2, 2014

(54) IMAGE PROCESSING OF APPARATUS CONDITION

(75) Inventors: Jeanne C. Maggiore, Wildwood, MO (US); Gerrod E. Andresen, Aledo, IL (US)

(73) Assignee: The Boeing Comapny, Chicago, IL (US)

( * ) Notice: Subject to any disclaimer, the term of this patent is extended or adjusted under 35 U.S.C. 154(b) by 1241 days.

(21) Appl. No.: 11/932,326

(22) Filed: Oct. 31, 2007

(65) Prior Publication Data

US 2009/0110289 A1   Apr. 30, 2009

(51) Int. Cl.
*G06K 9/00* (2006.01)
*G06T 7/00* (2006.01)

(52) U.S. Cl.
CPC ....... *G06T 7/001* (2013.01); *G06T 2207/30108* (2013.01); *G06T 2207/10016* (2013.01)
USPC .......................................................... 382/103

(58) Field of Classification Search
USPC .......................... 382/195, 181, 135, 190, 141
See application file for complete search history.

(56) References Cited

U.S. PATENT DOCUMENTS

| | | | | |
|---|---|---|---|---|
| 4,509,075 A * | 4/1985 | Simms et al. | .................. | 348/129 |
| 4,589,140 A * | 5/1986 | Bishop et al. | .................. | 382/148 |
| 5,982,362 A * | 11/1999 | Crater et al. | .................. | 715/719 |
| 6,529,620 B2 * | 3/2003 | Thompson | .................... | 382/141 |
| 6,542,076 B1 * | 4/2003 | Joao | .......................... | 340/539.14 |
| 6,965,816 B2 * | 11/2005 | Walker | ............................ | 701/16 |
| 7,068,301 B2 * | 6/2006 | Thompson | .................... | 348/143 |
| 7,505,604 B2 * | 3/2009 | Zakrzewski et al. | .......... | 382/100 |
| 7,593,564 B2 * | 9/2009 | Obara et al. | .................. | 382/141 |
| 7,675,541 B2 * | 3/2010 | Kondo | ............................. | 348/61 |
| 8,041,103 B2 * | 10/2011 | Kulkarni et al. | .............. | 382/144 |
| 8,248,595 B2 * | 8/2012 | Ochiai et al. | ................ | 356/237.2 |
| 2003/0215128 A1 * | 11/2003 | Thompson | ..................... | 382/141 |
| 2005/0157848 A1 * | 7/2005 | Miyauchi et al. | ............. | 378/207 |
| 2006/0119704 A1 * | 6/2006 | Buchheit | ......................... | 348/143 |
| 2007/0145308 A1 * | 6/2007 | Kemp | ...................... | 250/559.08 |
| 2007/0288219 A1 * | 12/2007 | Zafar et al. | ....................... | 703/14 |
| 2008/0204553 A1 * | 8/2008 | Thompson | ..................... | 348/143 |
| 2008/0205686 A1 * | 8/2008 | Tagami et al. | ................. | 381/398 |

FOREIGN PATENT DOCUMENTS

| | | | |
|---|---|---|---|
| DE | 3611125 A1 | | 10/1987 |
| GB | 2398771 | * | 9/2004 |
| WO | WO 03/059789 A2 | | 7/2003 |

OTHER PUBLICATIONS

Extraction Project Report dated Nov. 27, 2007 by Gerrod Andresen, 4 pages.
ATS SmartVision PC-based Vision system web page: http://www.atsautomation.com/automation/automationtech/st_smartvision.asp, Dated Aug. 25, 2008, containing 3 pages.
ThomasNet Video Inspection Systems web page: http://www.thomasnet.com/products/video-inspection-systems-91953661-1.html, dated Aug. 25, 2008, containing 3 pages.
International Search Report dated Mar. 9, 2009 for International Application No. GB0820033.9, 8 pages.

\* cited by examiner

*Primary Examiner* — Nancy Bitar
(74) *Attorney, Agent, or Firm* — Klintworth & Rozenblat IP LLC

(57) ABSTRACT

In one embodiment, a method of continually monitoring and detecting in real-time a condition of an apparatus is detailed. In one step, an apparatus is continually monitored in real-time using continual real-time images of the apparatus taken by at least one camera. In another step, the continual real-time images of the apparatus from the at least one camera are communicated to at least one computer processing unit. In still another step, the continual real-time images of the apparatus are processed using at least one software program embedded in the at least one computer processing unit in order to monitor and detect in real-time a condition of the apparatus.

20 Claims, 2 Drawing Sheets

IMAGE PROCESSING OF APPARATUS CONDITION

BACKGROUND

Many of the existing systems and/or methods of monitoring, inspecting, and/or detecting a condition of an apparatus utilize visual inspection by humans. This may be time-consuming, costly, unsafe, inefficient, unreliable, may lead to increased down-time, and/or may result in one or more other types of problems.

A system and/or method is needed to decrease one or more problems associated with one or more of the existing systems and/or methods of continually monitoring and/or detecting in real-time a condition of an apparatus.

SUMMARY

In one aspect of the disclosure, a method of continually monitoring and detecting in real-time a condition of an apparatus is provided. In one step, an apparatus is continually monitored in real-time using continual real-time images of the apparatus taken by at least one camera. In another step, the continual real-time images of the apparatus from the at least one camera are communicated to at least one computer processing unit. In still another step, the continual real-time images of the apparatus are processed using at least one software program embedded in the at least one computer processing unit in order to monitor and detect in real-time a condition of the apparatus.

In another aspect of the disclosure, a system for continually monitoring and detecting in real-time a condition of an apparatus is provided. The system comprises at least one camera for continually taking real-time images of an apparatus. The system further comprises at least one computer processing unit for processing continual real-time images of an apparatus taken by the at least one camera. The system additionally comprises a reference image fault database in the computer processing unit. The system further comprises at least one software program in the computer processing unit for detecting, based on continual real-time images of an apparatus, a condition of an apparatus using the reference image fault database.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
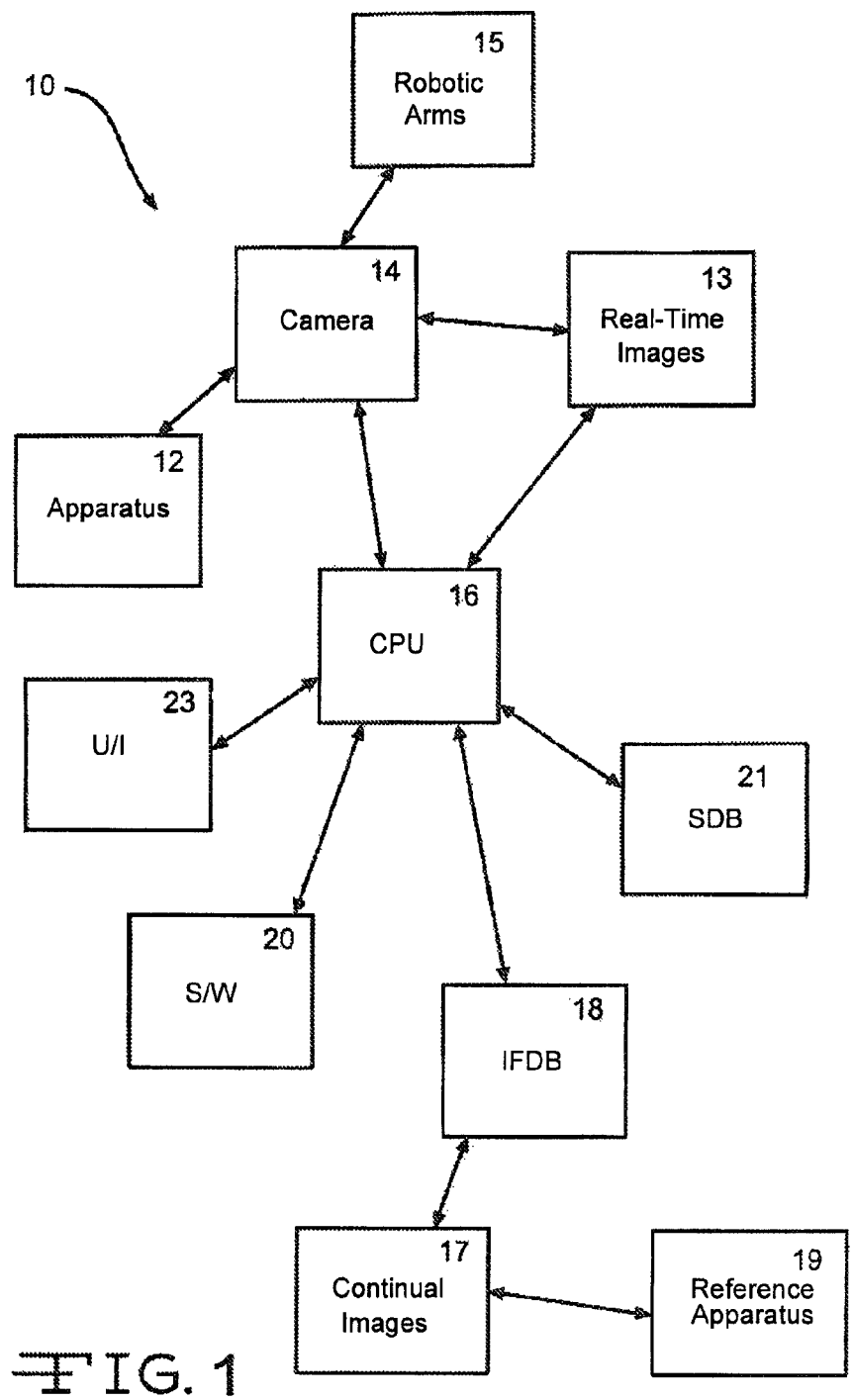
FIG. 1 shows a block diagram of one embodiment of a system for continually monitoring and/or detecting in real-time a condition of an apparatus.

FIG. 1 shows a block diagram of one embodiment of a system 10 for continually monitoring and/or detecting in real-time a condition of a monitored apparatus 12. The condition of the apparatus 12 may comprise the stele and/or mode of the apparatus 12 at that point in time. The apparatus 12 being monitored may comprise equipment, a tool, a vehicle, a satellite, an aircraft, an underwater device, a space device, and/or another type of apparatus. The system 10 may include one or more camera 14, one or more computer processing unit 16, one or more reference image fault database 18, one or more software program 20, one or more storage database 21, and/or one or more user interface 23, which all may be in communication with one another.

The camera 14 may be adapted to continually take real-time images 13 of a pre-determined portion of or location of the apparatus 12. The camera 14 may be at least one of high-resolution, infrared, high-definition, laser, night-vision, optical, light-illumination, laser-illumination, and/or other another type of camera. The camera 14 may be mounted to one or more robotic arms 15, and may be fixed in place, moveable, and/or remote-controlled.

The computer processing unit 16 may be adapted to process continual real-time images 13 of the apparatus 12 which are taken by the camera 14. The reference image fault database 18 may reside within the computer processing unit 16. The reference image fault database 18 may comprise continual images 17 which were taken over time of a reference apparatus 19 under varying conditions. The reference apparatus 19 may be substantially the same and/or substantially similar to the apparatus 12 being monitored. This may allow for the formulation and storage of reference images 17 in the reference image fault database 18 of a similar apparatus 19 under varying conditions in order to compare to the images 13 of the apparatus 12 being monitored. The reference image fault database 18 may provide reference images 17 of the similar apparatus 19 while it was operating normally, and/or reference images 17 of the similar apparatus 19 when it experienced a fault. For purposes of this disclosure, the term 'fault' is defined as an abnormality, an aberration, a degradation, a failure, a break-down, reduced performance, an unsafe operating condition, and/or an inconsistency of the apparatus 12. In such manner, the reference image fault database 18 may be used to analyze whether the apparatus 12 is operating normally and/or is experiencing a fault. In other embodiments, the reference image fault database 18 may contain data regarding any type of condition, and/or state of the similar apparatus 19 in normal conditions, non-normal conditions, and/or any other type of conditions.

The software program 20 may be run by the computer processing unit 16. The software program 20 may be adapted to detect, based on continual real-time images 13 of the apparatus 12 taken by the camera 14, a condition and/or fault in the apparatus 12 by comparing the real-time continual images 13 of the apparatus 12 with the reference images 17 stored in the reference image fault database 18. For purposes of this disclosure, the term 'condition' is defined as the mode and/or state of the apparatus 12. The software program 20 may be adapted to determine whether the apparatus 12 is outside of a desired state, is being used improperly, has a fault, and/or for determining the remaining life and/of predicted failure of the apparatus 12.

The storage database 21 may be adapted to store and/or tend a condition of the apparatus 12 over time. The computer processing unit 16 may be adapted to communicate with the user interface 23 in order to communicate at least one of a detected real-time fault and/or condition of the apparatus 12. In such manner, a user may be informed of a detected real-time fault and/or condition of the apparatus 12. The system 10 may allow for the automatic monitoring and/or detection, in real-time of a condition of the apparatus 12 without human intervention.

Figure 2:
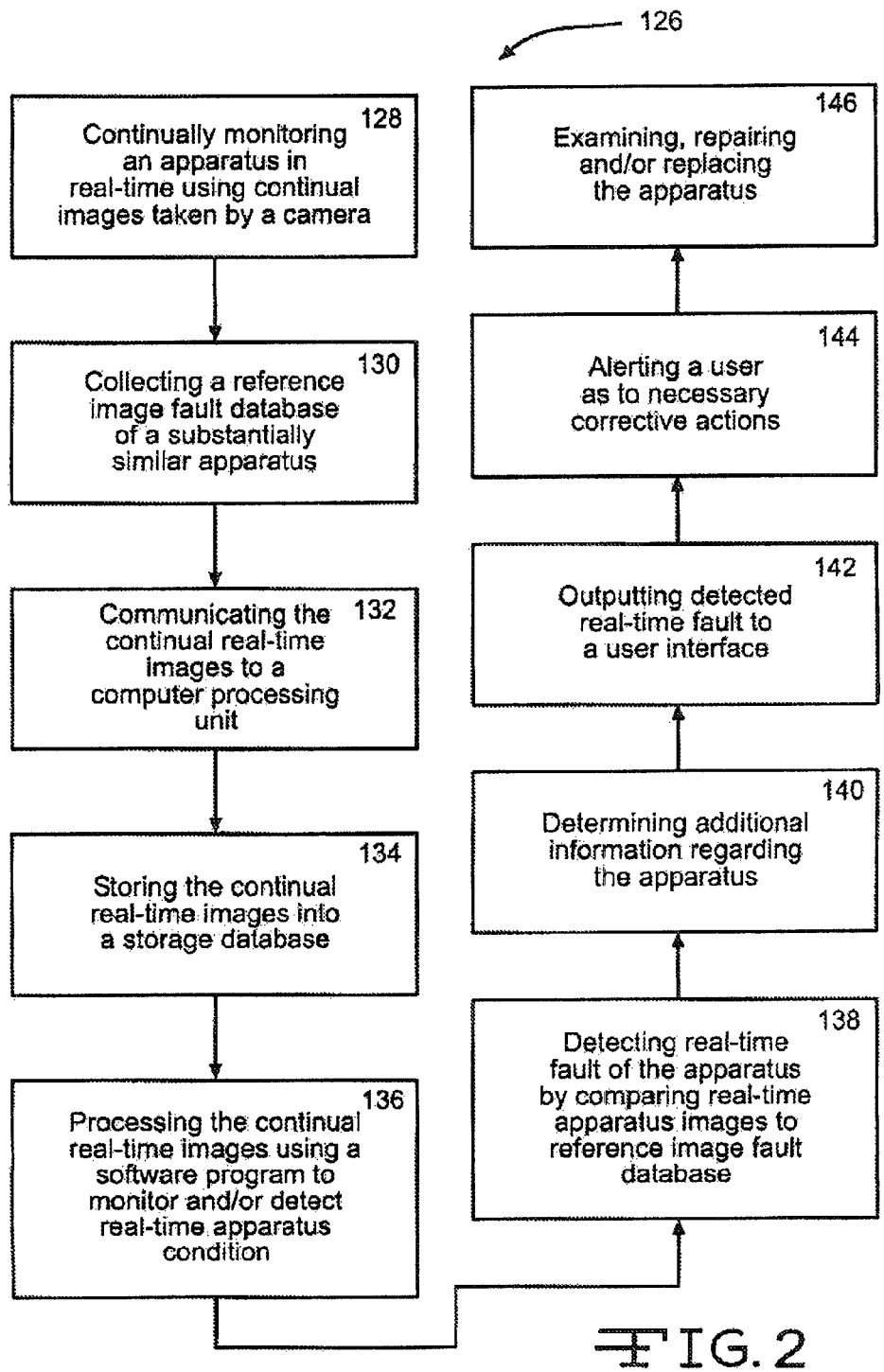
FIG. 2 shows a flowchart of one embodiment of a method of continually monitoring and/or detecting in real-time a condition of an apparatus.

FIG. 2 shows a flowchart under one embodiment of the disclosure of a method 126 of continually monitoring and/or detecting in real-time a condition of an apparatus 12. The method may be automated without human intervention. The condition of the apparatus 12 may comprise the state and/or mode of the apparatus 12 at any point in time. In one step 128, a pre-determined location of the apparatus 12 may be continually monitored in real-time using continual real-time images 13 of the apparatus 12 taken by at least one camera 14.

The camera 14 may monitor at least one of settings, positions, readings, color changes, surface changes, and/or other types of properties and/or activity of the apparatus 12. For instance, the camera 14 may monitor an aircraft during at least one of pre-flight, in-flight, and/or post-flight. In such manner, inspection processes regularly done on an aircraft during pre-flight, in-flight, and/or post-flight may be automated. The camera 14 may use high-resolution, infrared, high-definition, lasers, night-vision, optical capabilities, light-illumination, laser-illumination, and/or may use other features. The camera 14 may be mounted using one or more robotic arms 15.

In an additional step 130, a reference image fault database 18, having references images 17 of a substantially similar apparatus 19, may be collected and/or formed for comparison to continual real-time images 13 of the apparatus 12. This step 130 may comprise taking reference images 17 of the substantially similar reference apparatus 19 under varying conditions over time. Step 130 may be done before, during, or after step 128. In another step 132, the continual real-time images 13 of the apparatus 12 from the camera 14 may be communicated to at least one computer processing unit 16. In step 134, the continual real-time images 13 of the apparatus 12 may be stored into a storage database 21 and/or the condition of the apparatus 12 may be trended over time.

In still another step 136, the continual real-time images 13 of the apparatus 12 may be processed using at least one software program 20 embedded in the computer processing unit 16 in order to monitor and/or detect in real-time a condition of the apparatus 12. In an additional step 138, the software program 20 may detect a real-time fault of the apparatus 12 by comparing the continual real-time images 13 of the apparatus 12 to the references images 17 of the substantially similar reference apparatus 19 which are stored in the reference image fault database 18. In another step 140, the software program 20 may determine whether the apparatus 12 is outside of a desired state, may determine whether the apparatus 12 is being used improperly, may determine whether there is a fault of the apparatus 12, may determine the remaining life of the apparatus 12, and/or may determine a predicted failure of the apparatus 12.

In step 142, the detected real-time fault of the apparatus 12 may be outputted to a user interface 23. In step 144, a user may be alerted what corrective actions are required based on the processed continual real-time images 13. In step 146, the apparatus 12 may be closely examined, the apparatus 12 may be repaired, and/or the apparatus 12 may be replaced based on the processed continual real-time images 13.

One or more embodiments of the disclosure may reduce one or more problems of one or more of the existing methods and/or systems of monitoring and/or detecting in real-time a condition of an apparatus 12. For instance, monitoring and/or detecting time and/or cost may be reduced, downtime may be reduced, errors may be reduced, safety may be improved, reliability, consistency, and accuracy may be improved, and/or one or more other types of problems may be reduced.

It should be understood, of course, that the foregoing relates to exemplary embodiments of the disclosure and that modifications may be made without departing from the spirit and scope of the disclosure as set forth in the following claims.

The invention claimed is:

1. A method of monitoring and detecting in real-time a fault of a monitored apparatus comprising:
    collecting a reference image fault database by taking fault images of a reference apparatus when the reference apparatus experiences a fault, the reference apparatus being substantially similar to the monitored apparatus;
    monitoring the monitored apparatus by taking a real-time image of the monitored apparatus with at least one camera;
    communicating the real-time image of the monitored apparatus from the at least one camera to at least one computer processing unit;
    detecting a real-time fault of the monitored apparatus using said at least one computer processing unit using a software program by comparing the real-time image of the monitored apparatus to said fault images of said reference apparatus to determine whether the monitored apparatus has a fault; and
    communicating via the computer processing unit the detected fault of the monitored apparatus to a user interface and alerting a user as to what corrective action is required.

2. The method of claim 1 wherein the monitored apparatus comprises at least one of an equipment, a tool, a vehicle, a satellite, an aircraft, an underwater device, or an in-space device.

3. The method of claim 1 wherein the monitoring of the monitored apparatus comprises the at least one camera taking the real-time image of a pre-determined portion of the monitored apparatus.

4. The method of claim 1 wherein the monitoring of the monitored apparatus comprises the at least one camera taking the real-time image of at least one of a setting, a position, a reading, a color change, or a surface change of said monitored apparatus.

5. The method of claim 1 wherein the at least one camera comprises at least one of high-resolution, infrared, high-definition, laser, night-vision, optical, light-illumination, or laser-illumination.

6. The method of claim 1 wherein the monitoring of the monitored apparatus comprises the at least one camera taking the real-time image of an aircraft during at least one of pre-flight, in-flight, or post-flight.

7. The method of claim 1 wherein the at least one camera is mounted on one or more robotic arms.

8. The method of claim 1 further comprising at least one of storing the real-time image of the monitored apparatus into a storage database or trending a condition of the monitored apparatus over time based on the real-time image of the monitored apparatus using the at least one computer processing unit.

9. The method of claim 1 further comprising the at least one computer processing unit determining whether the monitored apparatus is outside of a desired state, determining whether the monitored apparatus is being used improperly, determining remaining life of the monitored apparatus, or determining predicted failure of the monitored apparatus.

10. The method of claim 1 further comprising at least one of examining the monitored apparatus, repairing the monitored apparatus, or replacing the monitored apparatus based on the detected real-time fault of the monitored apparatus.

11. The method of claim 1 further comprising performing the method automatically.

12. A system for monitoring and detecting in real-time a fault of a monitored apparatus comprising:
  at least one camera for taking a real-time image of the monitored apparatus;
  at least one computer processing unit for processing the real-time image of the monitored apparatus taken by the at least one camera;
  a reference image fault database in communication with the at least one computer processing unit, said reference image fault database containing fault images of a reference apparatus which were taken when the reference apparatus experienced a fault, the reference apparatus being substantially similar to the monitored apparatus;
  programming code in communication with the at least one computer processing unit configured to detect a real-time fault of the monitored apparatus by comparing the real-time image of the monitored apparatus taken by the at least one camera with the fault images of the reference apparatus contained in the reference image fault database; and
  a user interface in communication with the computer processing unit, wherein the computer processing unit communicates the detected fault of the monitored apparatus to the user interface and alerts a user as to what corrective action is required.

13. The system of claim 12 wherein the system is attached to at least one of equipment, a tool, a vehicle, a satellite, an aircraft, an underwater device, or an in-space device.

14. The system of claim 12 wherein the at least one camera is at least one of high-resolution, infrared, high-definition, laser, night-vision, optical, light-illuminated, or laser-illuminated.

15. The system of claim 12 wherein the at least one camera is mounted on one or more robotic arms.

16. The system of claim 12 further comprising at least one storage database for storing the real-time fault of the monitored apparatus or trending a condition of the monitored apparatus over time.

17. The system of claim 12 wherein the system is configured to automatically monitor and detect in real-time the fault of the monitored apparatus.

18. The system of claim 12 wherein the programming code is configured to determine whether the monitored apparatus is outside of a desired state, whether the monitored apparatus is being used improperly, a remaining life of the monitored apparatus, or a predicted failure of the monitored apparatus.

19. The method of claim 1 wherein the monitoring the monitored apparatus comprises taking continuous real-time images of the monitored apparatus with the at least one camera.

20. The method of claim 9 further comprising the at least one computer processing unit determining whether the monitored apparatus is being used improperly.

\* \* \* \* \*